United States Patent [19]

Takagi et al.

[11] Patent Number: 4,949,326

[45] Date of Patent: Aug. 14, 1990

[54] OPTICAL INFORMATION RECORDING AND REPRODUCING SYSTEM USING OPTICAL DISKS HAVING AN ERROR CORRECTION FUNCTION

[75] Inventors: Yuji Takagi, Kadoma; Isao Satoh, Neyagawa; Makoto Ichinose, Sakai; Yoshihisa Fukushima, Osaka; Yuzuru Kuroki, Toyonaka; Yasushi Azumatani, Neyagawa, all of Japan

[73] Assignee: Matsushita Electric Industrial Co., Ltd., Osaka, Japan

[21] Appl. No.: 129,141

[22] Filed: Dec. 7, 1987

[30] Foreign Application Priority Data

| Dec. 10, 1986 | [JP] | Japan | 61-294024 |
| Dec. 19, 1986 | [JP] | Japan | 61-304275 |
| Dec. 24, 1986 | [JP] | Japan | 61-313904 |
| Mar. 6, 1987 | [JP] | Japan | 62-52535 |
| May 28, 1987 | [JP] | Japan | 62-132403 |

[51] Int. Cl.$^5$ ............................................. G11B 27/36
[52] U.S. Cl. ............................................. 369/54
[58] Field of Search ................... 369/53, 54, 58, 59; 371/37, 38, 39, 40, 37.1, 37.7, 38.1, 39.1, 40.1, 40.4

[56] References Cited

U.S. PATENT DOCUMENTS

| 4,211,997 | 7/1980 | Rudnick et al. | 371/40 |
| 4,495,623 | 1/1985 | George et al. | 371/40 |
| 4,498,146 | 2/1985 | Martinez | 369/58 |
| 4,606,016 | 8/1986 | Verboom et al. | 369/54 |
| 4,607,367 | 8/1986 | Ive et al. | 371/38 |
| 4,750,178 | 6/1988 | Sako et al. | 371/38 |
| 4,761,785 | 8/1988 | Clark et al. | 371/38 |

FOREIGN PATENT DOCUMENTS 257857 7/1986 France.
WOA85/013-
80 3/1985 World Int. Prop. O..

OTHER PUBLICATIONS

Audio vol. 69, No. 6, Jun. 1985, pp. 28–29, 39–40.
AFIPS Conference Proceedings, National Computer Conference, Houston, Tex., 7th–20th Jun. 1982, pp. 13–17.

Primary Examiner—Vincent P. Canney
Attorney, Agent, or Firm—Stevens, Davis, Miller & Mosher

[57] ABSTRACT

In a read only type optical disk and a write type optical disk each thereof having a data recording area and a spare area, first encoded data for error detection and correction are recorded in the data recording area. In the case of the read only type optical disk, the spare area is used as a check sector in which second encoded data are recorded. When error correction by first error control means becomes impossible while sectors in the data recording area are reproduced, second error control means performs error correction by using the check sector corresponding to an associated error sector. In the case of the write type optical disk, the spare area is used as an alternate sector. A defective sector detected by defective sector detecting means is alternately recorded by being replaced by the alternate sector through sector alternating means.

7 Claims, 16 Drawing Sheets

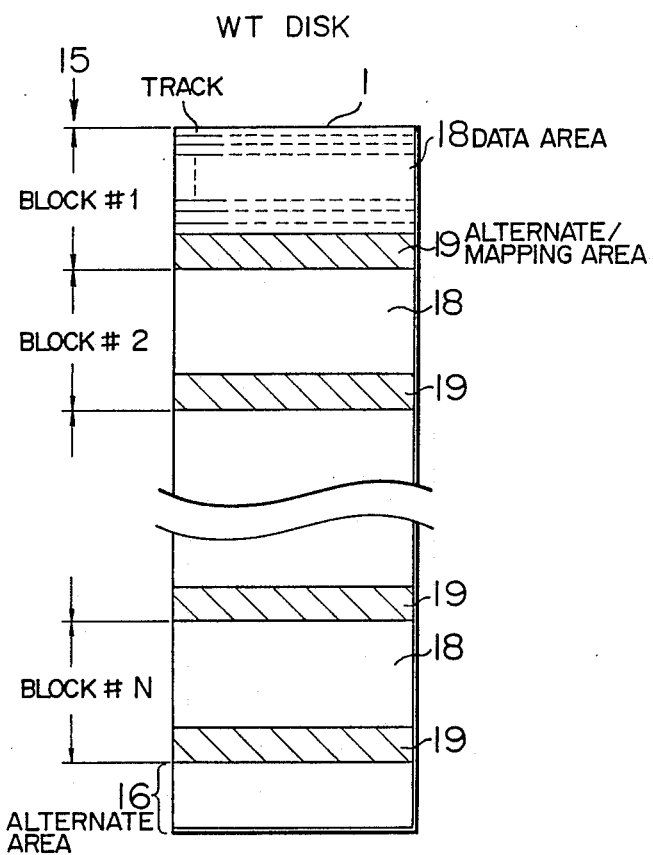

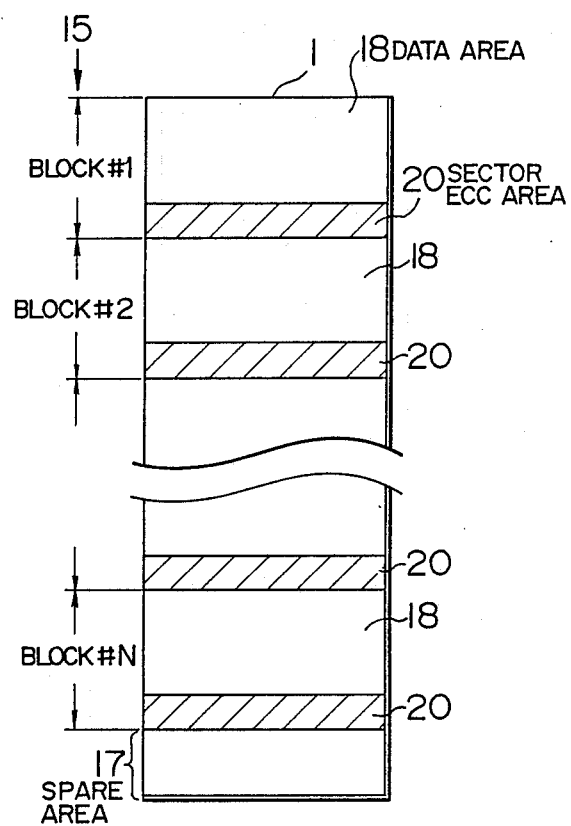

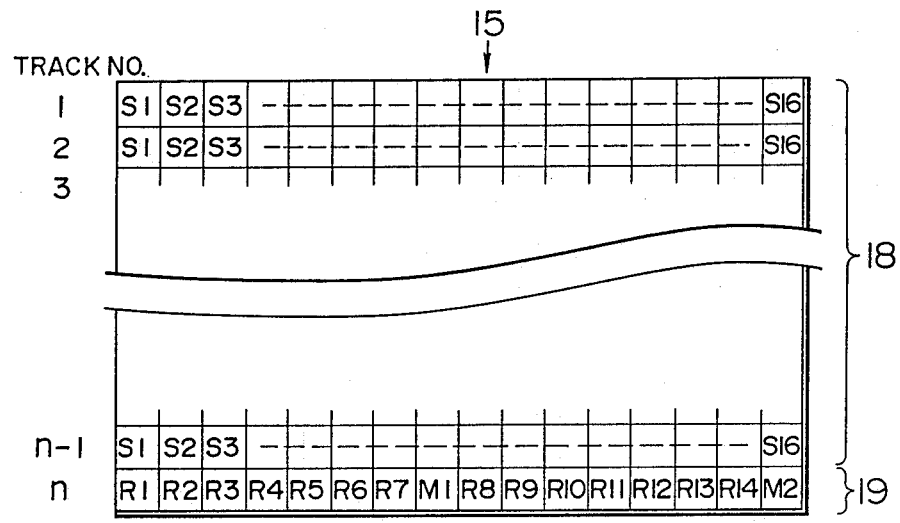
FIG. 3A  WT DISK
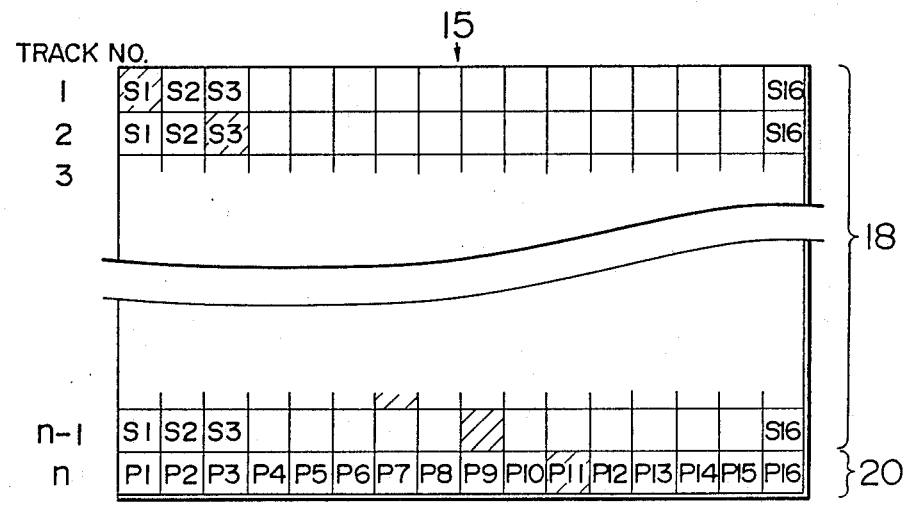
FIG. 3B  RO DISK

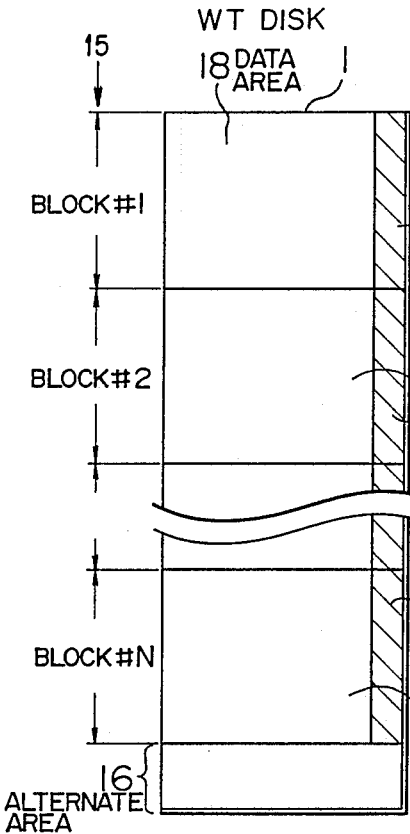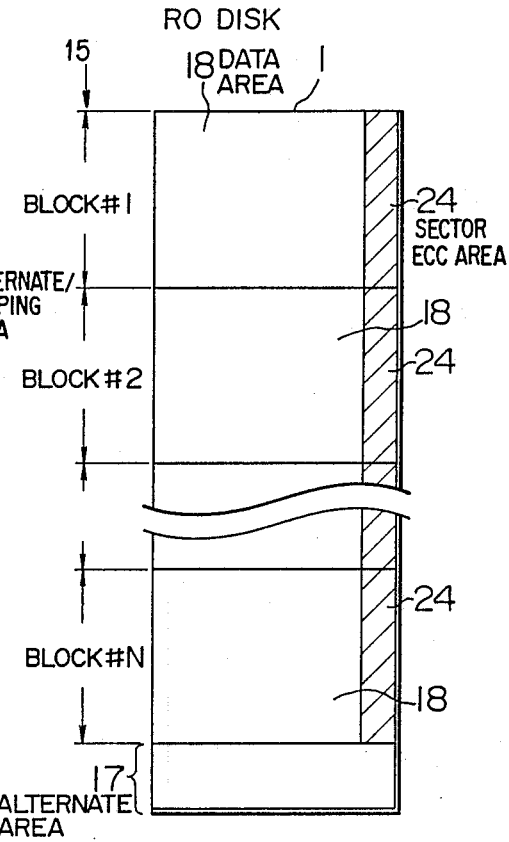

F I G. 6A
INFORMATION SECTOR
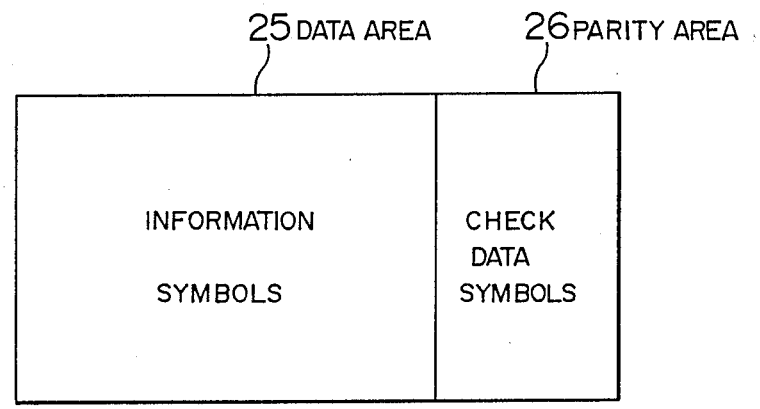
F I G. 6B
CHECK SECTOR
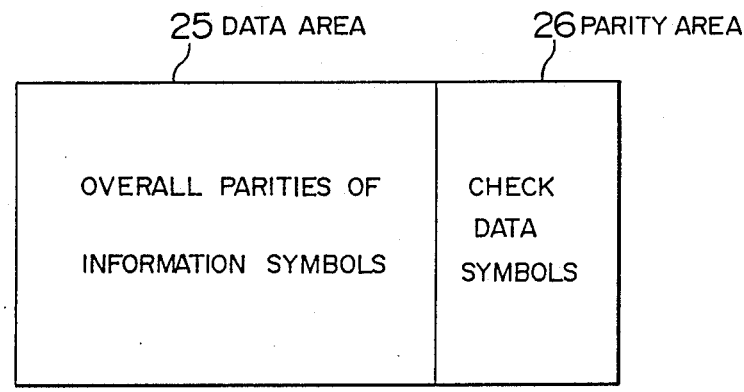

(a) DETECTION OF SECTOR ADDRESS ERROR

FIG. 13
(b) DETECTION OF DATA ERROR IN DATA SECTION
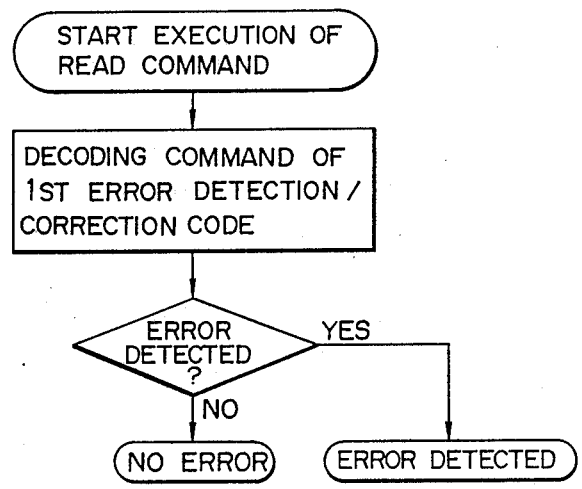
(c) DETECTION OF DEFECTIVE ERROR IN DATA SECTION
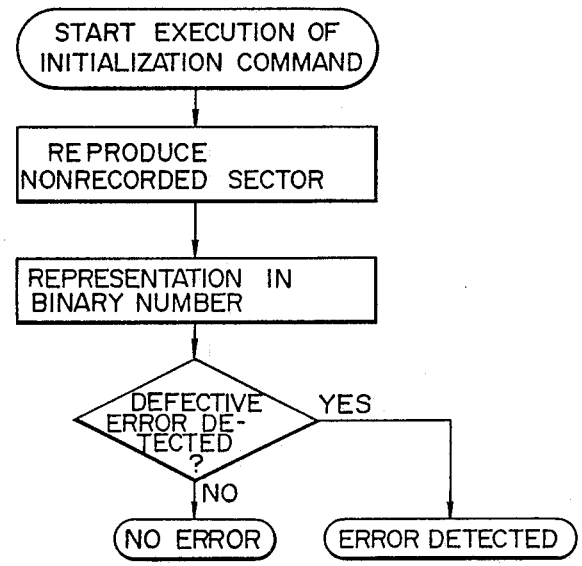

F I G. 16
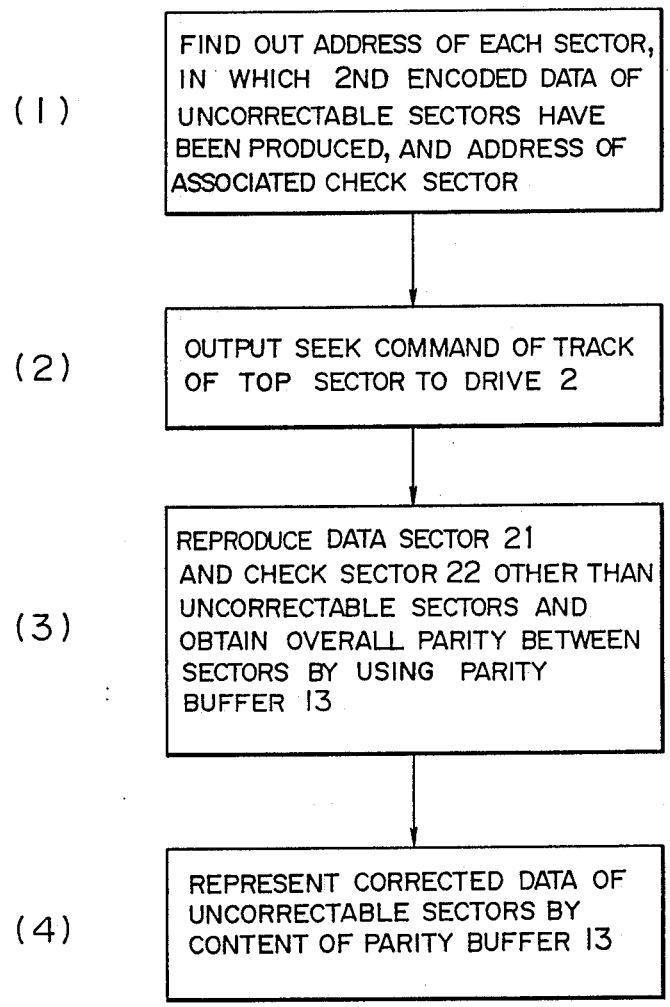

OPTICAL INFORMATION RECORDING AND REPRODUCING SYSTEM USING OPTICAL DISKS HAVING AN ERROR CORRECTION FUNCTION

BACKGROUND OF THE INVENTION

The present invention relates to an optical information recording and reproducing system for recording or reproducing information by irradiating with a laser beam, and, more particularly, to an optical information recording and reproducing system for dealing in a unified manner with defective sectors of a write type optical disk and a read only type optical disk.

A read only type optical disk (hereinafter referred to as RO optical disk), in which data are recorded on a disk-shaped plastic base material in the form of concave and convex pits of a submicron order and the data are reproduced by a laser beam, and further a write type optical disk (hereinafter referred to as WT disk), in which data can be recorded like a magnetic disk, are receiving attention.

In these disks, code data are recorded or reproduced on a sector unit basis to serve as an external storage device for a personal computer or the like. In particular, there is a demand for an optical information recording and reproducing system of a multidisk type having compatibility which makes it possible for the RO optical disk, from which a large amount of data can be reproduced at low cost, and the WT disk, on which a user can freely record data, to be reproduced or to be recorded and reproduced, respectively, by the same apparatus.

In an optical disk, data are recorded and reproduced by irradiating it with a laser beam which has been converged to have a diameter of about 1 $\mu$m. Therefore, various kinds of data errors are caused by dust on a surface of the disk, impurity substances in a base material of the disk, defects on the recording surface and the like. In order to correct and detect such data errors, in an optical disk having a sector structure, an encoding process to detect and correct errors is applied to data on a sector unit basis, thereby causing data in each sector to be correctly reproduced. However, since the error detection/correction code employs sectors of 512 bytes to 2 kilo bytes as a unit it is difficult to provide a sufficient interleaving length therefore as can be done in a compact disc (CD) having no sector structure. If a long form of error extending to occupy the whole area of a sector occurs, these errors cannot be corrected, so that it becomes difficult to perform proper data reproduction.

Therefore, in a WT disk, immediately after data have been recorded thereon, a read verification process is performed, in which data are reproduced and a check is made to see if the recorded data are accurately reproduced or not. When defective sectors are detected by the read verification process, alternating processing is performed, in which the defective sectors are recorded in alternate sectors provided in a special area on the optical disk. However, there have been several problems in the WT disk such that, because defects of the optical disk increase due to the median life or an increase in the number of repetitive recording times, it becomes complex and difficult to manage the alternate sectors and also the alternating processing time becomes long.

On the other hand, since a large number of duplicates of the RO optical disk are produced by a stamping method in a special factory, the foregoing read verification process cannot be used there. Therefore, the quality control of data is performed by reading data from all the disks produced, by checking the read-out data to find out defective disks and by destroying such defective disks which have been found. However, such total inspection (or 100% inspection) as mentioned above gives rise to a problem of an increase in manufacturing cost.

SUMMARY OF THE INVENTION

In consideration of the foregoing problems, it is an object of the present invention to provide an optical information recording and reproducing system in which, by dealing in a unified manner with defective sectors of an optical disk by the same track allocation process, data can be reproduced with high reliability in any one of a write type optical disk and a read only type optical disk.

The present invention relates to an optical disk characterized in that first encoded data for the detection and correction of errors are recorded in each sector, second encoding is performed by using the data in a plurality of sectors, in which the first encoded data have been recorded, as an information symbol section, and a check symbol section of the second code is recorded in sectors different from the plurality of sectors.

Further, the present invention relates to an optical information recording and reproducing system comprising: disk type discriminating means for discriminating a type of an optical disk; first error control means for producing first encoded data obtained by encoding data with a first error detection/correction code and for detecting and correcting errors in reproduced first encoded data; recording/reproducing means for recording or reproducing the first encoded data in or from the optical disk; second error control means for correcting errors by using check sectors which have recorded second encoded data obtained by encoding the first encoded data as an information symbol section of a second error detection/correction code; defective sector detecting means for detecting defective sectors; and sector alternating means for alternating the defective sectors in data sectors.

With the above-described structure of the system of the present invention, the kind of an optical disk is discriminated by the disk type discriminating means. When an optical disk is determined to be a write type optical disk, the spare areas are used as alternate sectors and defective sectors detected by the defective sector detecting means are replaced by the alternate sectors through the sector alternating means. In the case of an optical disk having rewritable data areas, the sector alternating means assigns spare areas to the alternate sectors and mapping sectors. Then, the sector alternating means makes use of memory means, which stores mapping data, and alternately records the alternate sectors in place of defective sectors among the data sectors by using the mapping data stored in the memory means and re-records in the mapping sectors the address correspondence map information with respect to the defective sectors in the data sectors and the alternate sectors which have been alternately recorded in place of the defective sectors. On the other hand, in the case of the read only type optical disk, the spare areas are used as check sectors in which the second decoded data has been recorded beforehand, and, when error correction by the first error control means becomes impossible while sectors in the data areas are reproduced, the second error control means performs error correction by using a check sector corresponding to an associated error sector.

BRIEF DESCRIPTION OF THE DRAWINGS

FIG. 2A and 2B are diagrams showing an embodiment of the optical disk format structure of the present invention;

FIGS. 3A and 3B are detailed structural diagrams showing the blocks 15 in FIGS. 2A and 2B;

FIGS. 5A and 5B are diagrams showing an embodiment of another optical disk format structure which is applied to this invention;

FIGS. 6A and 6B show a first embodiment of the sector construction of the RO optical disk of this invention;

FIGS. 12 to 16 are flowcharts for illustrating the operation of the control CPU 10 shown in FIG. 1;

FIG. 12 shows the overall outline;

FIG. 13 shows the detecting operation of defective sectors;

FIG. 14 shows the operation of recording on the WT disk;

FIG. 15 shows the operation of reproducing data; and

FIG. 16 shows the operation of decoding the second error detection/correction code in the RO optical disk when error correction has become impossible while the first error detection/correction code is decoded.

DESCRIPTION OF THE PREFERRED EMBODIMENTS

Figure 1:
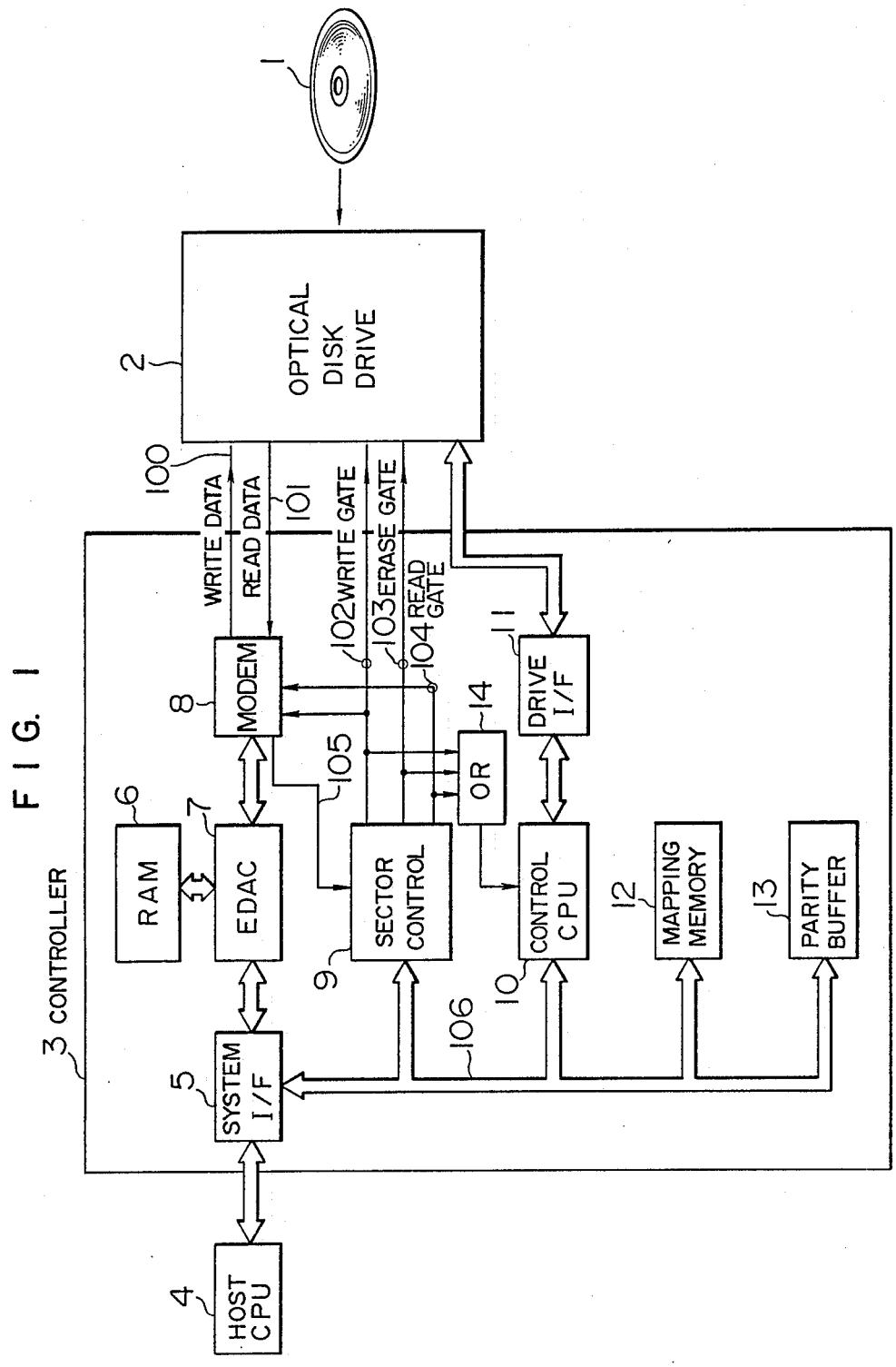
FIG. 1 is a block diagram showing an embodiment of the optical information recording and reproducing system for recording or reproducing data in or from the optical disk according to the present invention.

FIG. 1 is a block diagram showing an embodiment of an optical information recording and reproducing system for recording or reproducing data in or from an optical disk according to the present invention. In FIG. 1, reference numeral 1 denotes an optical disk; 2 an optical disk drive (hereinafter referred to simply as drive) which records or reproduces data in or from the optical disk 1; 3 a controller which connects the drive 2 with a host CPU 4; 4 the host CPU which uses the drive 2 and the controller 3 as external storage devices; 5 a system interface which provides an interconnection between the system and the host CPU 4; 6 a random access memory (RAM) for temporarily storing data and an error detection/correction code; and 7 an error detection/correction circuit (EDAC) for producing first encoded data obtained by encoding data with a first error detection/correction code to thereby correct errors occurring in reproduced data and for decoding the first encoded data by using a second error detection/correction code to thereby correct errors occurring in reproduced data which errors can not be corrected by using the first error detection/correction code. Numeral 8 denotes a data modulator/demodulator circuit (MODEM) for digitally modulating encoded data obtained by adding the first error detection/correction code to data from the host CPU 4 and outputting write data 100 and for demodulating data from read data 101 sent from the drive 2; 9 a sector read/write control circuit for detecting an object sector address and generating a start signal for starting recording, reproducing or erasing; 10 a control CPU which controls the operation of the controller 3; 11 a drive interface which provides an interconnection between the control CPU 10 and the drive 2; 12 a mapping memory for storing mapping data of the mapping sectors of the optical disk 1; 13 a parity buffer acting as a work area which is used when decoding the second error detection/correction code in the check sectors; 14 an OR circuit which provides an OR of a write gate 102, an erase gate 103 and a read gate 104; 100 the write data which are modulated data from the MODEM 8 and which are recorded in the optical disk 1; 101 the read data reproduced from the optical disk 1; 102 the write gate indicating that the write data 100 is valid; 103 the erase gate which is used to erase data recorded on the optical disk 1; 104 the read gate which instructs the MODEM 8 to start data demodulation; 105 a reproduced address signal; and 106 a CPU data bus of the control CPU 10.

FIGS. 2A and 2B are diagrams showing disk format structures in the first embodiment of the optical disk used in the present invention. FIG. 2A shows a disk format structure of a WT disk. FIG. 2B shows a disk format structure of an RO optical disk.

In FIGS. 2A and 2B, reference numeral 1 denotes an optical disk; 15 indicates blocks (#1 to #N) each thereof comprising a plurality of tracks; 16 an alternate area which records defective sectors which overflowed alternate/mapping areas 19; 17 a spare area which corresponds to the alternate area 16 and which is not used in the RO optical disk; 18 data areas which record encoded data obtained by encoding data by the first error detection/correction code; 19 the alternate/mapping areas which alternately record defective sectors occurring in the blocks 15 and manage alternate map information; and 20 sector ECC areas composed of check sectors which have been encoded by the second error detection/correction code.

FIGS. 3A and 3B are detailed structural diagrams showing the block 15 in FIGS. 2A and 2B. FIG. 3A shows a detailed structure of a WT disk. FIG. 3B shows a detailed structure of an RO optical disk.

In FIG. 3A, the block 15 has n tracks comprising: (n−1) tracks (Nos. 1 to n−1) each thereof having data sectors S (S1 to S16) for recording or reproducing data; and one track composed of alternate sectors R (R1 to R7 and R8 to R14), which alternate defective sectors of the data sectors S, and mapping sectors M (M1 and M2) which manage address correspondence information for the alternated defective sectors and the alternate sectors. In the embodiment of FIG. 3, since the mapping sectors M are the most important management data for an optical disk, a plurality of sectors are assigned to the mapping sectors in consideration of the reliability of the data and a possible system outage due to a power failure or the like during the recording of the mapping data. In FIG. 3B, the block 15 comprises: (n−1) tracks (Nos. 1 to n−1) each thereof having data sectors S (S1 to S16) in which data have been recorded beforehand; and one track having check sectors P (P1 to P16) each of which has recorded therein second encoded data obtained by encoding first encoded data in the data sector S as an information code by using the second error detection/correction code. FIG. 3B shows a state in which the overall parties of the hatched data sectors S1, S3, ---- in the data sectors S are recorded in the check sector P11.

The operations of the optical disk and the optical information recording and reproducing system of the embodiment of the present invention having the foregoing construction will now be described hereinbelow with reference to the flowcharts shown in FIGS. 12 to 16.

Figure 12:
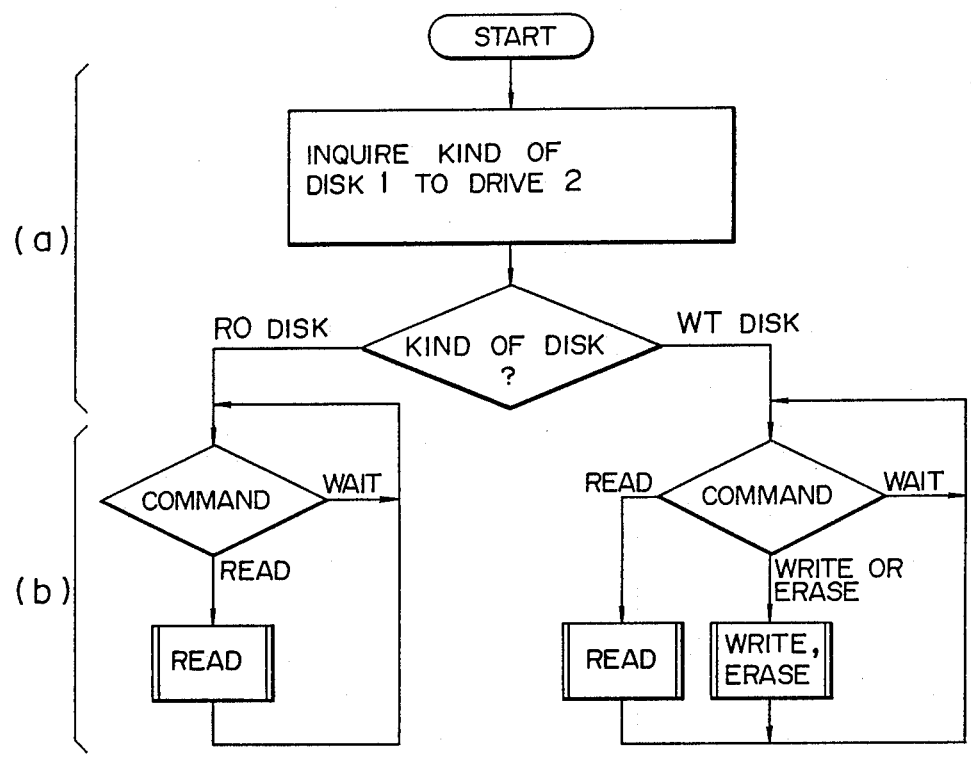

Firstly, as illustrated in the part (a) in FIG. 12, when the power source is turned on or when the optical disk 1 is exchanged, the controller 3 inquires concerning the kind of the optical disk 1 which is mounted presently on the drive 2. The drive 2 detects the kind of the optical disk 1 by a discriminating a hole formed in the optical disk cartridge or by the control information recorded on a control track of the optical disk 1, and informs the controller 3 of the content of the detected kind of the optical disk 1. Then, in the part (b), the controller 3 executes each of the read, write and erase commands in accordance with the kind of each of the RO optical disk and the WT disk.

When the optical disk 1 is a write type optical disk, the blocks #1 to #N among the blocks 15 are formatted at first. Test data are recorded and reproduced in or from all the sectors in each of the blocks 15, and a check is performed to see if there is any sector address error, data error, or defect in the data section. It is assumed that the mapping sector M (M1 and M2) has recorded therein mapping data indicative of the alternation of defective sectors involving errors.

Figure 13:
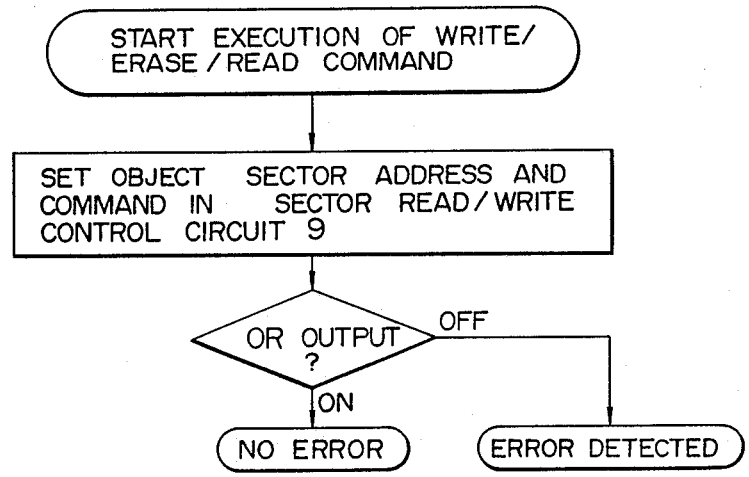

Defective sectors are detected in the following manner in accordance with the flowchart shown in FIG. 13.

(a) In the case of a sector address error, an object sector address and either one of the write, erase, and read commands are set in the sector read/write control circuit 9. The sector read/write control circuit 9 detects the sector address from the reproduced address signal 105. When it is detected that the sector address coincides with the object sector address, the sector read/write control circuit 9 outputs either one of the write gate 102, erase gate 103 and read gate 104 in accordance with the set command. Each one of the outputs is inputted to the OR circuit 14. An output of the OR circuit 14 is checked by the control CPU 10 to detect the presence or absence of errors. If an output of the OR circuit 14 is detected, it is decided that the sector address is correct. If it is not detected, the sector address is decided to be erroneous.

(b) With respect to data errors occurring in the data section, recorded data are read out, and the first error detection/correction code is decoded. As a result, data errors are detected.

(c) A defect in the data section is detected from the width and number of binary signals obtained by making binary representation of reproduced signals from nonrecorded sectors in accordance with a predetermined threshold value.

The mapping data are composed of: the address of defective sectors occurring in the block 15 and those of the alternate sectors which have alternated the defective sectors; the utilization state of the alternate sectors; the utilization state of sectors in the alternate track area; and the like.

The number of tracks (n tracks) in the block 15 is selected to be a value which makes it possible to perform high speed retrieval in view of the characteristic of the retrieving mechanism of the optical disk drive 2, namely, a value within a movable range (a range for high density retrieval or track jumping) of the actuator of an optical head. By selecting the number of tracks in this manner, there is no need to use a low-speed linear motor and the sector alternation processing can be performed at a high speed.

Figure 14:
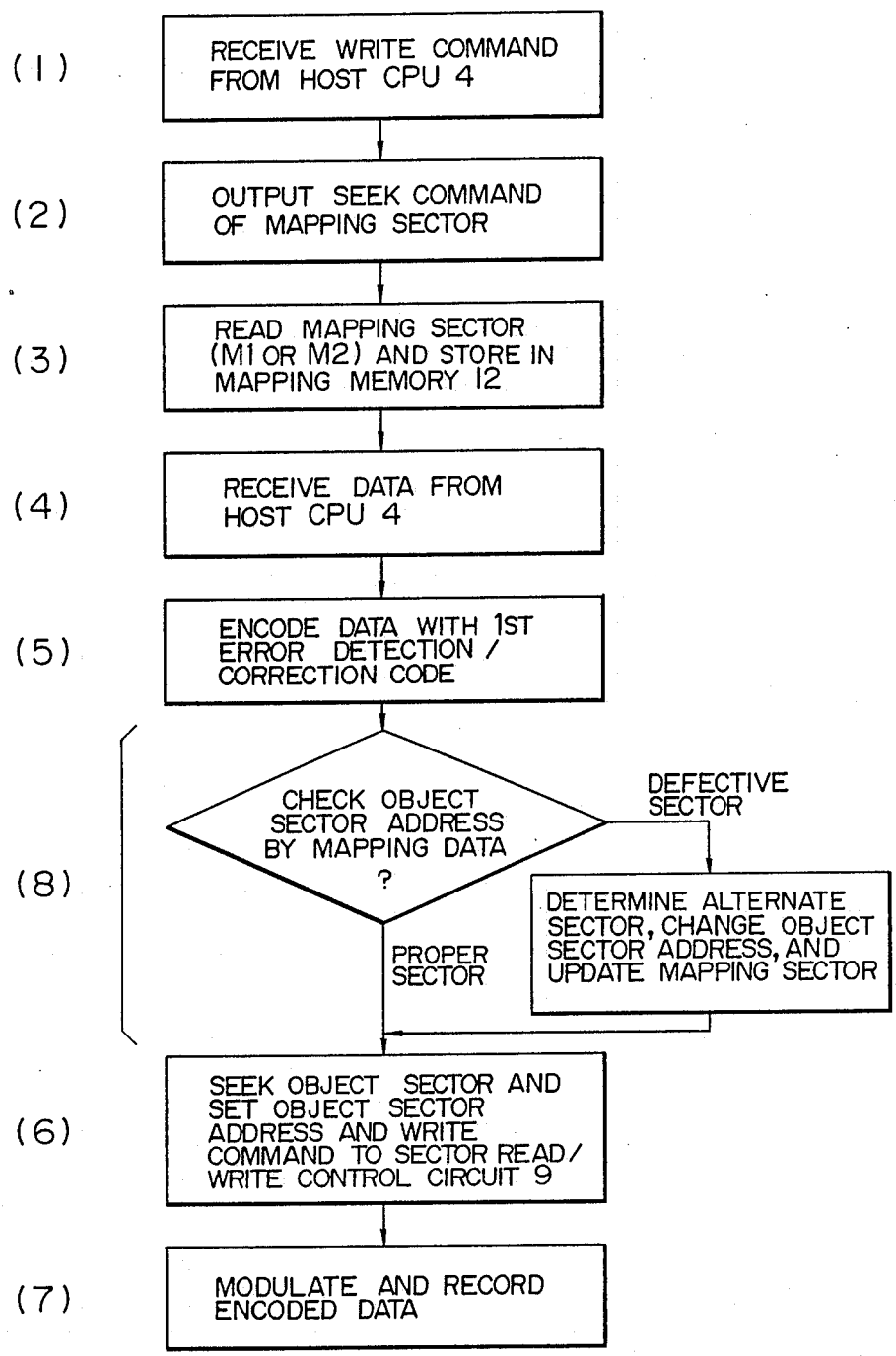
Figure 15:
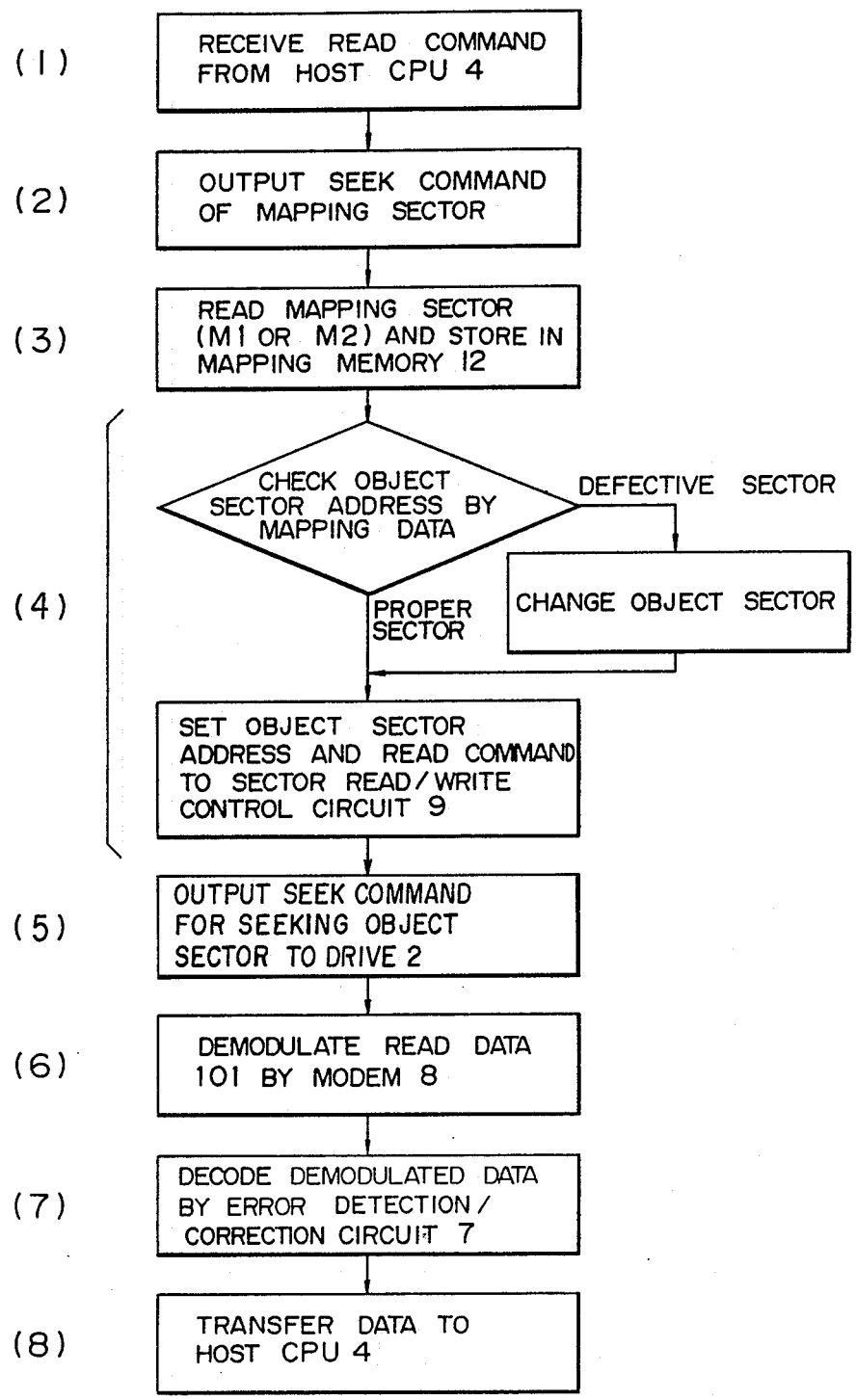

The operation of recording data in the case where a WT disk is used as the optical disk 1 will now be explained in accordance with the flowchart of FIG. 14.

(1) The host CPU 4 outputs a write command to the system interface 5. The write command includes device command blocks (DCB) which contain the object sector address, the number of sector blocks to be recorded, the write operation code, and the like.

(2) The control CPU 10 in the controller 3 receives the DCB from the system interface 5 and instructs the drive 2 to seek the track in the alternate/mapping area 19 in the block 15 to which the object sector belongs. (In FIG. 1, blocks for the retrieval system of the drive 2, control CPU, and drive control interface are not shown.)

(3) After completion of seeking the track, the control CPU 10 in the controller 3 reads the mapping sector $M_1$ and stores in the mapping memory 12. If the mapping sector $M_1$ is erroneous, the mapping sector $M_2$ is read.

(4) After the mapping data has completely been stored in the mapping memory 12, the data are transferred from the host CPU 4 to the RAM 6 via the system interface 5.

(5) The error detection/correction circuit 7 provides the first error detection/correction code to the data transferred to the RAM 6.

(6) The control CPU 10 instructs the drive 2 to seek the track of the object sector and sets the address of the object sector and a write command to the sector read/write control circuit 9.

(7) When the sector read/write control circuit 9 detects the object sector, it causes an output signal from the write gate 102 to be applied to the MODEM 8. Then, the MODEM 8 reads the encoded data from the RAM 6, effects digital modulation of the encoded data, and supplies the thus obtained write data 100 to the drive 2. Upon receipt of an output signal from the write gate 102, the optical disk drive 2 places a semiconductor laser drive circuit in the recording mode and modulates a laser beam by the write data 100 to record the write data 100 in the sectors.

(8) With respect to the object sector address in the item (6), a check is made to see if the associated sector is defective or not, by making reference to the mapping data in the mapping memory 12, prior to recording. If the object sector is a defective sector, a corresponding alternate sector address is sought out from the mapping data. The data are recorded in the alternate sector R in the alternate/mapping area 19 of an associated block 15. Further, when the alternate sectors in the associated block 15 are fully occupied, unused sectors in an alternate area 16 are assigned to alternate sectors. The mapping memory 12 is rewritten, and the associated mapping sectors $M_1$ and $M_2$ are updated.

The data recording operation is as described above. The data reproducing operation will now be described hereinbelow with reference to FIG. 15.

(1) The host CPU 4 outputs a read command to the system interface 5. The read command includes device command blocks (DCB) which contain the object sector address, the number of sector blocks to be read, the read operation code, and the like.

(2) The control CPU 10 in the controller 3 receives the DCB from the system interface 5, and instructs the drive 2 to seek the track in the alternate/mapping area 19 of the block 15 to which the object sector belongs.

(3) After completion of seeking the track, the control CPU 10 in the controller 3 reads the mapping sector $M_1$ and stores in the mapping memory 12. If the mapping sector $M_1$ is erroneous, the mapping sector $M_2$ is read.

(4) After completion of storing the mapping data in the mapping memory 12, the control CPU 10 sets the address of the object sector and a read command to the sector read/write control circuit 9. With respect to the object sector address, a check is made to see if the associated sector is defective or not, by making reference to the mapping data in the mapping memory 12, prior to reproducing. If the associated sector is a defective sector, a corresponding alternate sector address is sought from the mapping data.

(5) The controller 3 locates the track to which the object sector address belongs and instructs the drive 2 to seek the located track.

(6) When the sector read/write control circuit 9 detects the object sector, it causes an output signal of the read gate 104 to be applied to the MODEM 8. Then, the MODEM 8 demodulates the read data 101 and stores the demodulated data in the RAM 6.

(7) The demodulated data stored in the RAM 6 are subjected to error detection and correction in the error detection/correction circuit 7, and thereafter, they are stored again in the RAM 6.

(8) The error corrected data in the RAM 6 are transferred to the host CPU 4 via the system interface 5.

In this manner, the reproducing operation of data is completed.

Further, there is a case where the sectors of an optical disk become defective due to deterioration of a recording film caused by repetitive recording of data or due to adhesion of dust or dirt to a recording surface of the disk while it is used. Therefore, immediately after data have been recorded, the recorded data are read and the quality of the data is checked by decoding the first error detection/correction code. If there are found any error exceeding a predetermined reference degree involved in a sector, such a sector is decided to be a defective one and is replaced by an alternate sector. This read verifying operation is checked under a severe condition in which the reproducing condition and error correcting capability are purposely deteriorated to retain a margin.

Then, the data in the associated sector is recorded in an unused alternate sector of the associated block 15. The content of the mapping memory 12 is updated. New mapping data are recorded in the mapping sector M. Due to this, it becomes possible to make the content of the mapping sector M be always coincident with the alternate relation between a data sector S and an alternate sector R. Further, by simultaneously recording the state of using the alternate sectors R in the mapping sectors M in addition to the mapping data, it becomes possible to immediately learn of usable alternate sectors. By selecting the number of tracks in the block 15 to be several tens which number the optical head actuator is allowed to access at a high speed, not only initial defective sectors but also additional defective sectors, which have occurred while using the disk and which have been subjected to alternating processing, can be sufficiently registered by using one or two mapping sector M. Here, the capacity of the mapping data is also as small as one or two sectors. Therefore, by providing the controller 3 with a small capacity of memory, the mapping data can be easily managed.

For example, it is now assumed that one block is composed of 64 tracks, one track is composed of 16 sectors, one sector is composed of 1024 bytes, and that the mapping data are composed of the defective sector address of three bytes and the alternate sector address of three bytes. In this case, since defective sectors corresponding to 170 sectors can be stored, it is possible to deal with data having a defect ratio as great as $170/(64 \times 16) = 16.6\%$. This value is practically a sufficient value. As mentioned above, since defective sectors are managed by the mapping sectors on a block unit basis, it is sufficient that the capacity of the mapping memory 12 in the controller 3 has a small capacity of about one to two sectors. Besides, since the block can be retrieved at a high speed by high density retrieval jumping of the optical head, the sectors can be alternated at a high speed.

As will be obvious from the above description, by dividing the optical disk into blocks and by providing mapping sectors, which record the mapping data of defective sectors and alternate sectors, at every block, an efficient high-speed sector alternating process can be realized. In addition, since the mapping memory for storing the mapping data can be made to have a small capacity by the block management, the cost of the system can be reduced.

Figure 4:
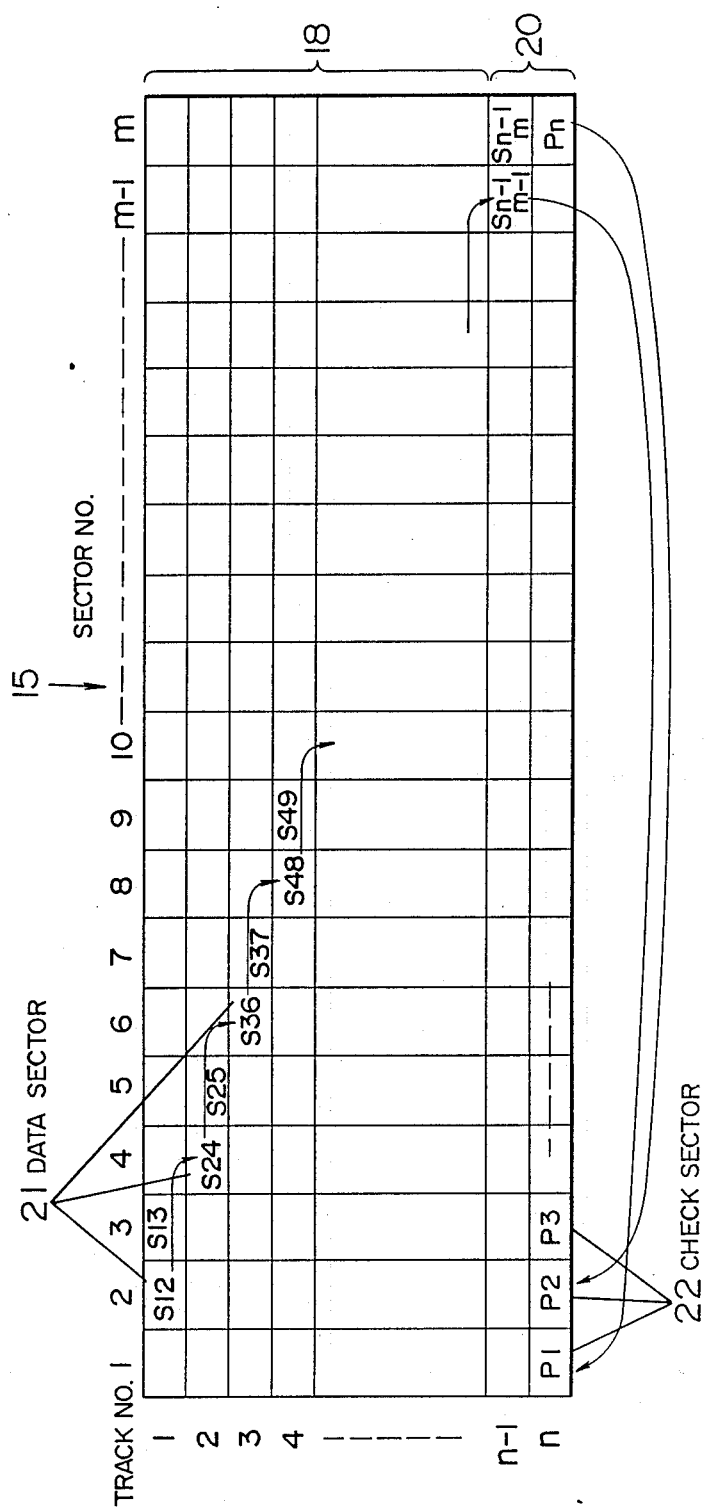
FIG. 4 shows the second error correction code in the sector ECC area 20 of the RO optical disk of this invention.

FIG. 4 is a structural diagram showing the second error correction code of the sector ECC area 20 of the RO optical disk of an embodiment of the present invention. In FIG. 4, reference numeral 21 denotes data sectors and 22 indicates check sectors.

The data area 18 is shown in FIG. 4 as an example in which (n−1) tracks and m sectors are involved. Among the first encoded data of the data sectors 21 which have been encoded with the first error correction code, the second encoded data obtained by making overall parity checking of the total (n−1) sectors which are picked up, one sector for each track, and being shifted at every third sector between every two successive tracks, as shown in FIG. 4, are recorded in the check sectors 22 in the sector ECC area 20. Namely, the n check sectors P1 to Pn are recorded beforehand in accordance with the order such as: the overall parity P1 of the encoded data S12 in the track 1 and sector 2, the encoded data S24 in the track 2 and sector 4, ---, and the encoded data Sn−1 m−1 in the track (n−1) and sector (m−1); the overall parity P2 of the encoded data S13 in the track 1 and sector 3, the encoded data S25 in the track 2 and sector 5, ---, and the encoded data Sn−1 m in the track (n−1) and sector (m); and the like. In accordance with FIG. 16, an explanation will now be made with respect to the data reproducing operation in the case where the RO optical disk having the blocks 15 of the structure as shown in FIG. 4 has such defects as to cause errors existing in the whole sectors and uncorrectable errors have been detected by the error detection/correction circuit 7 during the data reproducing operation.

(1) The control CPU 10 in the controller 3 finds out the sector address of the associated block, which produced the second encoded data of uncorrectable sectors, and the associated check sector 22 in the sector ECC area 20.

(2) The controller 3 instructs the drive 2 to seek the track of the top sector.

(3) After completion of track seeking, the control CPU 10 reproduces data of each sector one at a time from the data sectors 21 and check sectors 22 other than the uncorrectable sectors. With respect to the first encoded data in the RAM 6, the overall parity checking of the sectors are made by using the parity buffer 13 as a work area.

(4) The content of the parity buffer 13, in which all the overall parities of the data sectors 21 and check sectors 22 other than uncorrectable sectors have been calculated, indicates the corrected data of the uncorrectable sectors.

As will be apparent from FIG. 4, in the data sectors 21 in the block 15, on which overall parity checking is made, only one sector has the same sector address. Therefore, so far as the number of defects occurring in the sector ID sections and gap sections between the data field sections of at least two adjacent sectors is within several tens to one hundred bytes, two or more sectors associated with the check sectors 22 can not become error-uncorrectable. Thus, it is possible to perform error correction with no problem.

Further, it is obvious that, if the Reed Solomon code or the like multiple errors correcting code is recorded in a plurality of sectors in place of overall parities, even when errors occur in a plurality of sectors, they can be corrected.

As explained above, an RO optical disk which is strong against defects can be constituted by the same disk format as that of a WT disk. Therefore, it is possible to obtain such effects that disk formats for optical disks can be unified, the logical sector address and physical sector address can be easily managed, and the capacity of the control microcodes of the controller can be reduced.

FIGS. 5A and 5B are diagrams showing a disk format structure in the second embodiment of the optical disk which is applied to the present invention. FIG. 5A shows the disk format structure of a WT disk. FIG. 5B shows the disk format structure of an RO optical disk. In FIGS. 5A and 5B, reference numerals 1 and 15 to 18 indicate the same components as those shown in FIGS. 2A and 2B. Numeral 23 denotes a sector alternate/mapping area and 24 denotes a sector ECC area. The respective areas are provided at every track.

It is sufficient to provide one sector alternate/mapping area 23 for one track in view of the fact that the probability of occurrence of error uncorrectable sectors is within a range from $10^{-8}$ to $10^{-10}$.

The structures shown in FIGS. 5A and 5B are intended to reduce time required for the data recording of the optical disk 1 having spiral tracks and that for the processing of the read verification just after the recording. By performing a jumping operation of one track in the sector alternate/mapping area 23, the waiting time of the rotation of the disk is minimized.

FIGS. 6A and 6B show a first embodiment of a sector structure of the RO optical disk of the present invention. FIG. 6A shows an information sector in which information is recorded. FIG. 6B shows a check sector which has been encoded by the error detection/correction code, sector by sector for a plurality of the above-mentioned information sectors. In FIGS. 6A and 6B, reference numeral 25 denotes a data area and 26 indicates a parity area. Each sector is divided into the two logical areas. In each information sector shown in FIG. 6A, information symbols are recorded in the data area 25, and check data symbols obtained by encoding the information symbols with the error detection/correction code in the sections are recorded in the parity area 26. Next, in the check sector shown in FIG. 6B, the overall parities of the information symbols in N information sectors are recorded in the data area 25. Further, check data symbols obtained by encoding the overall parities of the information symbols with the error detection/correction code in the sectors are recorded in the parity area.

In a conventional optical disk constructed as explained above, the check data symbols recorded in the parity area 26 of the check sectors shown in FIG. 6B are the check symbols obtained by encoding the overall parities of the information symbols recorded in the data area 25 with the error detection/correction code in the sectors. At the same time, those check data symbols are also the overall parities of each check data symbol recorded in each parity area 26 in each of N information sectors shown in FIG. 6A. Therefore, when reproducing a certain information sector, if the decoding of the error detection/correction code in the sector becomes impossible and hence the error correction becomes impossible, by producing the overall parities of the (N−1) information sectors and check sectors other than the associated information sector, it becomes possible to decode the information sector.

Figure 7:
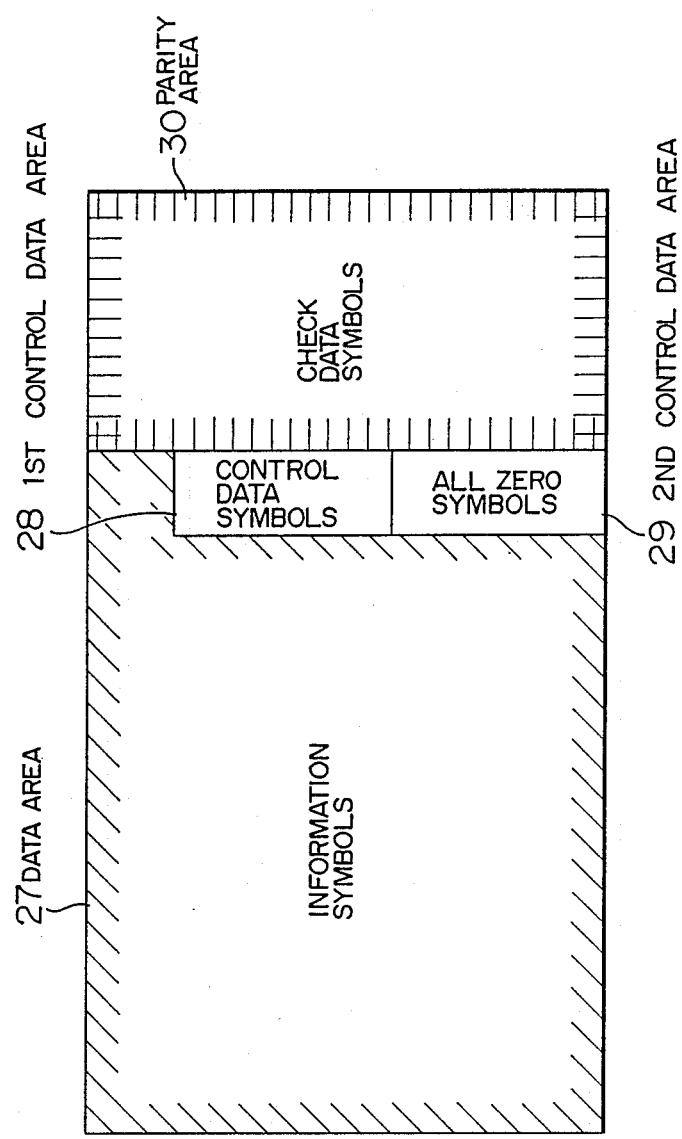
FIG. 7 shows a second embodiment of the sector construction of the RO optical disk of this invention.

FIG. 7 shows the structure of an information sector of an RO optical disk in the second embodiment of this invention. In FIG. 7, reference numeral 27 denotes a data area, 28 a first control data area, 29 a second control data area, and 30 a parity area.

In the information sector divided into the four logic areas as mentioned above, the information symbols are recorded in the data area 27. The control data symbols such as addresses or the like, each of which is peculiar to each information sector are recorded in the first control data area 28, and all zero symbols are recorded in the second control data area 29. Further, the parity area 30 records therein check data symbols obtained by encoding respective data recorded in the data area 27, the first control data area 28 and the second control data area 29 by using the error detection/correction code in the sectors to thereby perform the error detection/correction.

Figure 8:
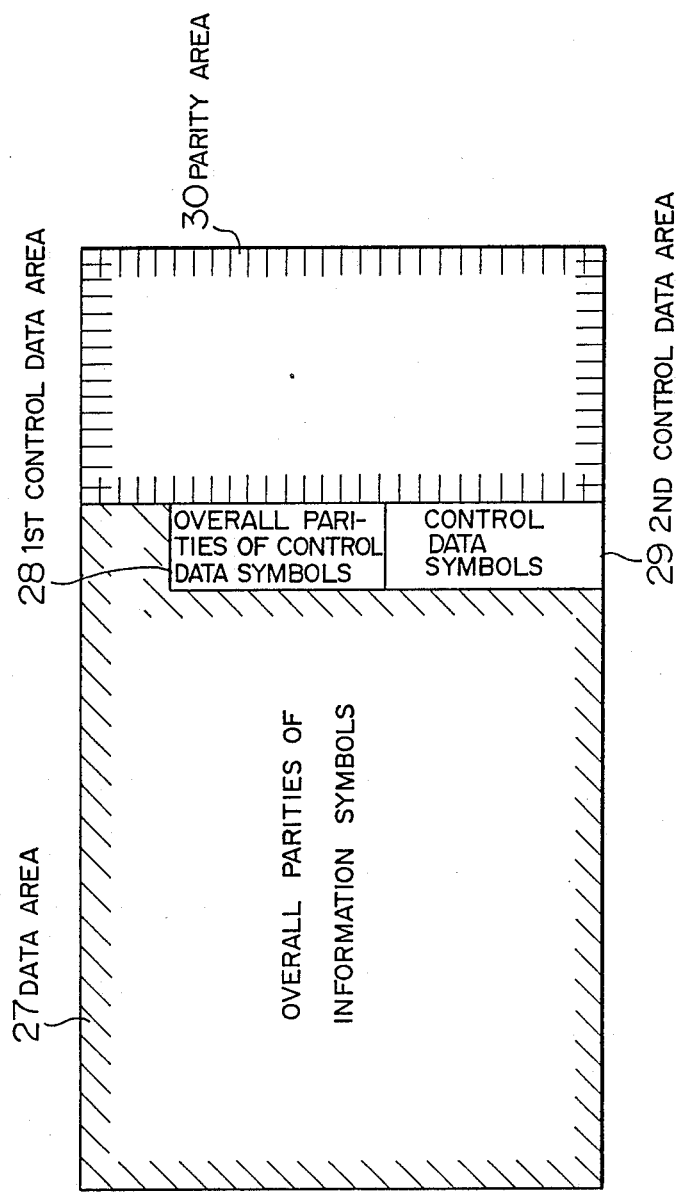
FIG. 8 is a diagram showing an embodiment of a construction of the check sector of the optical disk.

FIG. 8 shows the structure of a check sector of an RO optical disk in the first or second embodiment of this invention. In FIG. 8, reference numerals 27 to 30 represent the same components as those shown in FIG. 7.

In the check sector shown in FIG. 8 which is divided into the four logical areas as mentioned above, the overall parities of each information symbol in each of the N information sectors are recorded in the data area 27. The overall parities of each control data symbol in each of the N information sectors are recorded in the first control data area 28. The control data symbols such as addresses or the like, each of which is peculiar to each associated check sector, are recorded in the second control data area 29. Further, the parity area 30 records therein check data symbols obtained by encoding respective data recorded in the data area 27, the first control data area 28 and the second control data area 29 by using the error detection/correction code in the sectors to thereby perform the error detection/correction.

Firstly, the overall parities of the (N−1) information sectors and check sectors other than the associated uncorrectable sector are produced. Next, the control CPU 10 replaces the overall parities of the information symbols of the N information sectors and those of the control data symbols, which have been recorded in the data area 27 and the first control data area 28 of the check sectors, respectively, by all zeros, and then encodes them through the error detection/correction circuit 7, thereby producing pseudo check sector data which are then stored in the RAM 6. Then, an exclusive OR of the overall parities of the (N−1) sectors and the check sectors which have previously been produced and of the pseudo check sector data is calculated. The resultant overall parities are the data of the associated information sectors. Thus, it becomes possible to reproduce data in the proper manner.

As explained above, according to the RO optical disk and the RO optical disk reproducing system in the embodiments of the invention, the address which is peculiar to each sector can be recorded as the control data together with the information. Further, by obtaining the overall parities of a plurality of sectors, even when a long error spreading over the whole area of a sector has occurred, it becomes possible to reproduce data properly.

In the embodiments of the invention, the control data are used as the address of a sector. However, it will be apparent that a disk identification flag or any other arbitrary control data may be used as the address of a sector.

Figure 9:
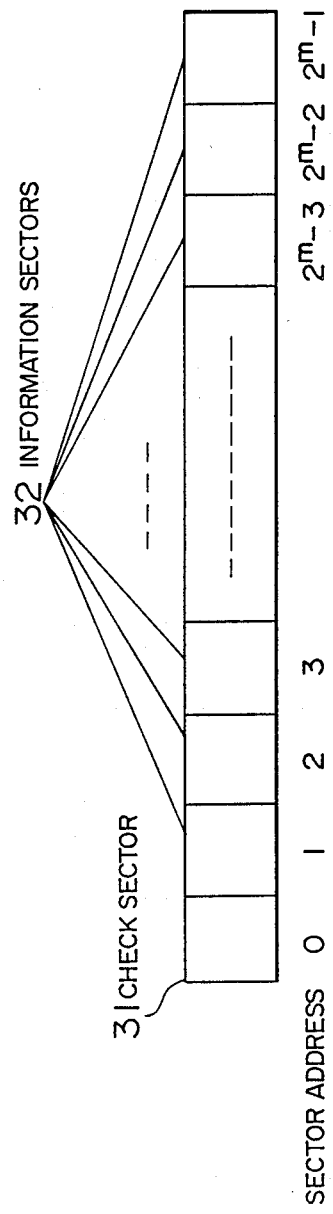
FIG. 9 is a diagram showing an embodiment of a construction of a track of the optical disk which is applied to this invention.

FIG. 9 shows the structure of a track on an optical disk in the embodiment of this invention. In FIG. 9, reference numeral 31 denotes a check sector, and 32 denotes information sectors. One track is composed of $2^m$ sectors. In the optical disk in the embodiment of this invention having the structure mentioned above, information is recorded in the information sectors 32 whose addresses are 1 to $(2^m-1)$. Further, the overall parities of the $(2^m-1)$ information sectors 32 are recorded in the check sector 31 whose address is zero.

Figure 10:
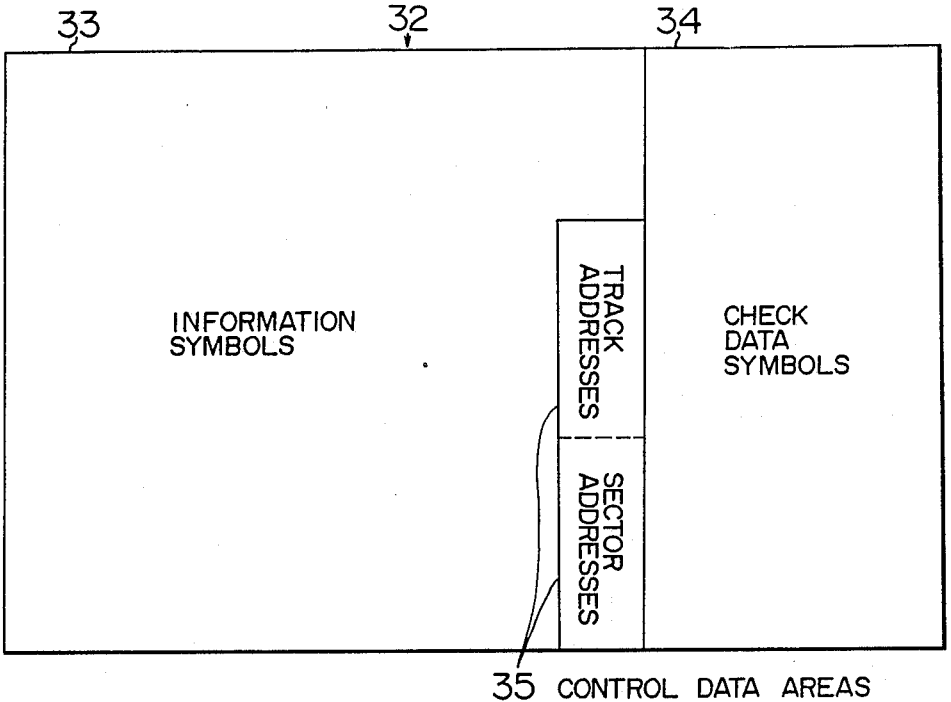
FIG. 10 is a diagram showing an embodiment of a construction of the information sector 32 of the optical disk which is applied to this invention.

FIG. 10 shows the structure of the information sector 32 of the optical disk in the embodiment of this invention. In FIG. 10, reference numeral 33 denotes a data area, 34 a parity area, and 35 a control data area. In the information sector 32 of the optical disk in the embodiment of this invention having the structure described above, the information symbols are recorded in the data area 33, and the address of each information sector is recorded in the control data areas 35. The address of the sector comprises a track address and a sector address. The parity area 34 records therein the check data symbols obtained by encoding each symbol recorded in the data area 33 and the control data areas 35 by using the error detection/correction code in the sectors.

Figure 11:
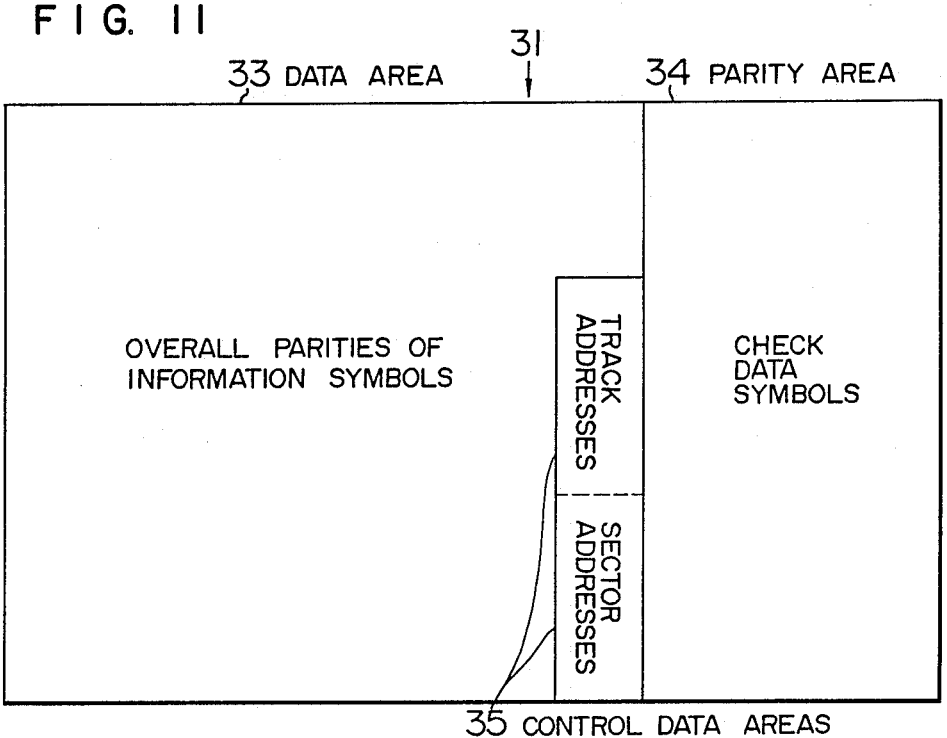
FIG. 11 is a diagram showing an embodiment of the check sector 31 of the optical disk which is applied to this invention.

FIG. 11 shows the structure of the check sector 31 of the optical disk in the embodiment of this invention. In FIG. 11, reference numerals 33 to 35 denote the same components 33 to 35 shown in FIG. 10. In the check sector 31 of the optical disk in the embodiment of this invention having the above-described structure, the overall parities of each information symbol of the $(2^m-1)$ information sectors 32 are recorded in the data area 33. The address of the associated check sector is recorded in the control data areas 35. The address of the sector comprises a track address and a sector address. The parity area 34 records therein the check data symbols obtained by encoding each symbol recorded in the data area 33 and the control data areas 35 by using the error detection/correction code in the sectors.

In the optical disk in the embodiment of this invention having the above-described structure, the addresses of the associated check sector 31, which are recorded in the control data areas 35 of the check sector 31, are the track address and the sector address of the associated check sector 31, and each of the addresses of the associated check sector 31 is also the overall parity of each address of each information sector 32 which is recorded in each control data area 35 of the $(2^m-1)$ information sectors 32. Namely, the production of the overall parities of each track address and sector address of the $(2^m-1)$ information sectors 32 also provides the track address and the sector address of the associated check sector 31.

Table 1 shows an example of addresses which are recorded in the control data areas 35 of each sector in the case of $2^m=16$ (namely, one track is composed of fifteen information sectors 32 and one check sector 31).

TABLE 1

| | | Example of Control Data | | | |
|---|---|---|---|---|---|
| | | Track 10 | | Track 20 | |
| | Sector No. | Track address | Sector address | Track address | Sector address |
| (Check sector) | 0 | 00001010 | 0000 | 00010100 | 0000 |
| (Information sector) | 1 | 00001010 | 0001 | 00010100 | 0001 |
| (Information sector) | 2 | 00001010 | 0010 | 00010100 | 0010 |
| (Information sector) | 3 | 00001010 | 0011 | 00010100 | 0011 |
| (Information sector) | 4 | 00001010 | 0100 | 00010100 | 0100 |
| (Information sector) | 5 | 00001010 | 0101 | 00010100 | 0101 |
| (Information sector) | 6 | 00001010 | 0110 | 00010100 | 0110 |
| (Information sector) | 7 | 00001010 | 0111 | 00010100 | 0111 |
| (Information sector) | 8 | 00001010 | 1000 | 00010100 | 1000 |
| (Information sector) | 9 | 00001010 | 1001 | 00010100 | 1001 |
| (Information sector) | 10 | 00001010 | 1010 | 00010100 | 1010 |
| (Information sector) | 11 | 00001010 | 1011 | 00010100 | 1011 |
| (Information sector) | 12 | 00001010 | 1100 | 00010100 | 1100 |
| (Information sector) | 13 | 00001010 | 1101 | 00010100 | 1101 |
| (Information sector) | 14 | 00001010 | 1110 | 00010100 | 1110 |
| (Information sector) | 15 | 00001010 | 1111 | 00010100 | 1111 |

Table 1 shows, as an example, a case where the track addresses are "10" and "20". "00001010, 0000" and "00010100, 0000" are recorded in the control data areas 35 of the check sector 31, respectively. These are the addresses of the check sector 31, and, at the same time, they are the overall parities of the addresses of the $(2^m-1)$ information sectors 32 (namely, the fifteen information sectors 32). In the example shown in Table 1, a case of the track addresses of "10" and "20" is shown. It is apparent that the same is the case with other tracks.

As described above, according to the invention, in the read only optical disk in which the error detection/correction encoding is performed by obtaining the overall parities between sectors, a sector address can be recorded in each sector together with information. As a result, it becomes possible to provide an excellent practical advantage.

What is claimed is:

1. An optical information recording and reproducing system for recording/reproducing data in/from a write type optical disk and for reproducing data from a read only type optical disk, each of which disks is divided into a plurality of blocks, each block having a plurality of tracks and being constituted by a data area for storing data and a spare area, and each track being segmented into a plurality of sectors, said system comprising:

disk type discriminating means for discriminating a type of an optical disk;

first error control means for producing first encoded data obtained by encoding data with a first error detection/correction code and for detecting and correcting errors in the reproduced encoded data;

recording/reproducing means for recording or reproducing said first encoded data in or from said optical disk;

second error control means for detecting and correcting errors by using check sectors each of which has recorded therein second encoded data obtained by encoding said first encoded data as an information symbol section of a second error detection/correction code;

defective sector detecting means for detecting a defective sector; and sector alternating means for alternating the defective sector in said data area of said block, wherein, when the write type optical disk has been detected by said disk type discriminating means, said spare area is used as an alternate sector and the defective sector detected by said defective sector detecting means is alternated by an alternate sector through said sector alternating means, and, when the read only type optical disk has been detected, said spare area is used as the check sector in which the second encoded data has been recorded beforehand, and an uncorrectable error occurring in said first error control means, while sectors in said data area are reproduced, is corrected through said second error control means by using the check sector corresponding to the error sector.

2. A system according to claim 1, wherein said sector alternating means has memory means for assigning the spare area to an alternate sector and a mapping sector and for storing mapping data in said mapping sector, and a defective sector in the data area is alternated by an alternate sector by using the mapping data in said memory means, and address correspondence map information with respect to the defective sector in said data area and the alternate sector, which has been alternately recorded in place of the defective sector, is re-recorded in said mapping sector.

3. A system according to claim 1, wherein said spare area is constituted by one track per block.

4. A system according to claim 1, wherein said spare area is constituted by one sector in every track in each block.

5. A system according to claim 1, wherein each block has the same arrangement of tracks and sectors in said data area and said spare area, both in the write type optical disk and the read only type optical disk.

6. A system according to claim 1, wherein said second error control means performs erasure correction by using an uncorrectable error occurring in said first error control means as erased information.

7. A read only optical disk having a plurality of tracks each of which is divided into a plurality of sectors, said optical disk comprising a plurality of information sectors and a plurality of check sectors, each of said information sectors and said check sectors being divided into four logical areas including a data area, a first control data area, a second control data area, and a parity area;

each of said information sectors having information symbols recorded in said data area thereof, control data symbols recorded in said first control data area thereof, all zero symbols recorded in said second control data area thereof, and check data symbols, obtained by encoding respective symbols in said data area, said first control data area, and said second control data area in each sector with a first error detection/correction code, recorded in said parity area thereof;

each of said check sectors having overall parities for respective information symbols of a predetermined number of information sectors recorded in the data area thereof, overall parities for respective control data symbols of said predetermined number of information sectors recorded in said first control data area thereof, control data symbols for said associated check sector recorded in said second control data area thereof, and check data symbols obtained by encoding respective symbols in said data areas, said first control data area, and said second control data area in each sector with the first error detection/correction code, recorded in said parity area thereof.

* * * * *